(12) United States Patent
Brandt et al.

(10) Patent No.: US 12,547,745 B1
(45) Date of Patent: Feb. 10, 2026

(54) PROACTIVE PRIVACY IN USER INTERFACE SESSION PLAYBACK USING SENSITIVE DATA DETECTION

(71) Applicant: FullStory, Inc., Atlanta, GA (US)

(72) Inventors: William Patrick Brandt, Decatur, GA (US); Joel Grayson Webber, Marietta, GA (US); Mark Nicholas Seth Fowler, Midlothian, VA (US); Sean Pollitt, Monroe, GA (US); Erik Higginbotham, Marietta, GA (US); Jonathan Forsythe, Atlanta, GA (US); Gregory Lutz, Roswell, GA (US); Timothy Simms, Ellicott City, MD (US)

(73) Assignee: FullStory, Inc., Atlanta, GA (US)

( * ) Notice: Subject to any disclaimer, the term of this patent is extended or adjusted under 35 U.S.C. 154(b) by 257 days.

(21) Appl. No.: 18/335,566

(22) Filed: Jun. 15, 2023

Related U.S. Application Data

(60) Provisional application No. 63/352,435, filed on Jun. 15, 2022.

(51) Int. Cl.
| | |
|---|---|
| *G06F 21/60* | (2013.01) |
| *G06F 9/451* | (2018.01) |
| *G06F 21/62* | (2013.01) |
| *G06F 3/04842* | (2022.01) |

(52) U.S. Cl.
CPC .......... *G06F 21/604* (2013.01); *G06F 9/451* (2018.02); *G06F 21/6263* (2013.01); *G06F 3/04842* (2013.01)

(58) Field of Classification Search
CPC .... G06F 21/604; G06F 9/451; G06F 21/6263; G06F 3/04842
See application file for complete search history.

(56) References Cited

U.S. PATENT DOCUMENTS

| | | | |
|---|---|---|---|
| 9,766,769 B1 | 9/2017 | Webber et al. | |
| 9,817,548 B2* | 11/2017 | Lai | G06F 3/04817 |
| 10,102,306 B2* | 10/2018 | Le Bras | G06F 16/2358 |

(Continued)

OTHER PUBLICATIONS

Grodzinsky, Frances S., Keith W. Miller, and Marty J. Wolf. "Session replay scripts: A privacy analysis." The Information Society 38.4 (2022): 257-268.*

*Primary Examiner* — Jimmy H Tran
(74) *Attorney, Agent, or Firm* — Fish & Richardson P.C.

(57) ABSTRACT

Methods, systems, and apparatus, including computer programs encoded on a computer storage medium, for detecting potentially sensitive data and updating rules that prevent the display of the potentially sensitive data in playback of user sessions with user interfaces. In one aspect, a method includes receiving, from a client device at which a user session occurs, event data related to the user session, detecting potentially sensitive data in the event data, generating and displaying playback of the user session using the event data including, displaying, within the playback of a particular user interface that includes a user interface element that displayed the potentially sensitive data, a sensitive data indicator that indicates that the user interface element includes the potentially sensitive data, and displaying a user interface control that enables a user to select whether to prevent data that is displayed by the user interface element from being displayed.

20 Claims, 10 Drawing Sheets

(56) References Cited

U.S. PATENT DOCUMENTS

| | | | |
|---|---|---|---|
| 10,388,182 B2* | 8/2019 | Castle | G09B 19/0053 |
| 10,430,212 B1* | 10/2019 | Bekmambetov | G06F 16/958 |
| 10,764,752 B1* | 9/2020 | Avetisov | H04L 63/0823 |
| 10,965,766 B2* | 3/2021 | Webber | G06F 11/3438 |
| 11,036,524 B1 | 6/2021 | Mastracci et al. | |
| 11,121,883 B1* | 9/2021 | Webber | H04L 63/0263 |
| 11,184,406 B1* | 11/2021 | Shashank | H04L 67/1095 |
| 11,216,585 B1* | 1/2022 | Clediere | H04L 63/10 |
| 11,363,108 B2* | 6/2022 | Webber | H04L 67/75 |
| 11,487,931 B1* | 11/2022 | Yin | G06F 40/205 |
| 11,574,114 B2* | 2/2023 | Ciabarra, Jr. | G06F 40/123 |
| 11,588,912 B2* | 2/2023 | Webber | G06F 11/3438 |
| 11,650,870 B2* | 5/2023 | Ciabarra, Jr. | G06F 11/0709 |
| | | | 714/38.1 |
| 11,663,655 B2* | 5/2023 | Benkreira | G06Q 40/02 |
| | | | 705/40 |
| 11,687,208 B2* | 6/2023 | Webber | G06F 11/3438 |
| | | | 715/234 |
| 11,797,318 B1* | 10/2023 | Joshi | G06F 9/3838 |
| 11,842,142 B2* | 12/2023 | Walker | G06F 16/954 |
| 2003/0229900 A1* | 12/2003 | Reisman | H04N 21/422 |
| | | | 348/E7.071 |
| 2008/0208579 A1* | 8/2008 | Weiss | G06Q 30/02 |
| | | | 707/E17.014 |
| 2008/0208587 A1* | 8/2008 | Ben-David | G10L 15/26 |
| | | | 704/275 |
| 2010/0182247 A1* | 7/2010 | Petschnigg | G06F 3/041661 |
| | | | 345/173 |
| 2011/0320880 A1* | 12/2011 | Wenig | G06F 11/3476 |
| | | | 714/39 |
| 2012/0173966 A1* | 7/2012 | Powell | H04L 67/02 |
| | | | 715/234 |
| 2013/0132833 A1* | 5/2013 | White | G06F 3/048 |
| | | | 715/704 |
| 2015/0026823 A1* | 1/2015 | Ramesh | H04L 63/102 |
| | | | 726/28 |
| 2015/0160788 A1* | 6/2015 | Sun | G06F 3/0481 |
| | | | 715/746 |
| 2016/0162704 A1* | 6/2016 | Powell | H04L 63/10 |
| | | | 726/28 |
| 2016/0170953 A1* | 6/2016 | Maddali | G06F 16/986 |
| | | | 715/234 |
| 2016/0188548 A1* | 6/2016 | Ciabarra, Jr. | G06F 40/123 |
| | | | 715/234 |
| 2016/0239680 A1* | 8/2016 | Holz | H04L 63/10 |
| 2016/0267523 A1* | 9/2016 | Biswas | G06Q 30/0201 |
| 2017/0019489 A1* | 1/2017 | Churchill | G06Q 30/0201 |
| 2017/0323026 A1* | 11/2017 | Le Bras | G06F 16/2358 |
| 2017/0364888 A1* | 12/2017 | Bell | G06Q 20/20 |
| 2018/0024846 A1* | 1/2018 | Wu | G06F 21/36 |
| | | | 715/741 |
| 2019/0303178 A1 | 10/2019 | Mastracci | |
| 2020/0012800 A1* | 1/2020 | Karako | H04L 63/0853 |
| 2020/0151348 A1* | 5/2020 | Chauhan | H04L 67/53 |
| 2020/0293680 A1* | 9/2020 | Navarro-Dimm | |
| | | | H04L 63/0421 |
| 2020/0334365 A1* | 10/2020 | Buck | H04W 4/029 |
| 2020/0396304 A1* | 12/2020 | Webber | G06F 11/302 |
| 2021/0042441 A1* | 2/2021 | Webber | G06F 3/0482 |
| 2021/0064325 A1* | 3/2021 | Mossoba | G06F 8/61 |
| 2021/0067492 A1* | 3/2021 | Mastracci | H04L 63/0254 |
| 2021/0173959 A1* | 6/2021 | Gueta | G06F 21/84 |
| 2021/0258394 A1* | 8/2021 | Webber | H04L 67/61 |
| 2021/0357939 A1* | 11/2021 | Davis | G06F 11/3476 |
| 2022/0019521 A1* | 1/2022 | Shang et al. | G06F 16/9027 |
| 2022/0286524 A1* | 9/2022 | Webber | H04L 41/5067 |
| 2023/0076870 A1* | 3/2023 | Arnold | G06F 21/604 |
| 2023/0087884 A1* | 3/2023 | Anasta | G06F 21/31 |
| | | | 726/27 |
| 2023/0090108 A1* | 3/2023 | Ciabarra, Jr. | G06F 21/6254 |
| | | | 726/26 |
| 2023/0105764 A1* | 4/2023 | Valkaitis | H04L 9/0822 |
| | | | 713/171 |
| 2023/0113338 A1* | 4/2023 | Buddhiraju | G06F 21/604 |
| | | | 726/27 |
| 2023/0171321 A1* | 6/2023 | Lackner | H04L 67/535 |
| | | | 709/203 |
| 2023/0216835 A1* | 7/2023 | Hoffman | H04L 51/04 |
| | | | 726/26 |
| 2023/0237180 A1* | 7/2023 | Scott | G06F 9/451 |
| | | | 726/28 |
| 2023/0385528 A1* | 11/2023 | Botbol | G06F 16/9577 |
| 2024/0004527 A1* | 1/2024 | Lee | G06F 21/6227 |
| 2024/0232425 A1* | 7/2024 | Leeke | G06F 21/6245 |
| 2025/0112976 A1* | 4/2025 | Lackner | H04L 67/535 |

* cited by examiner

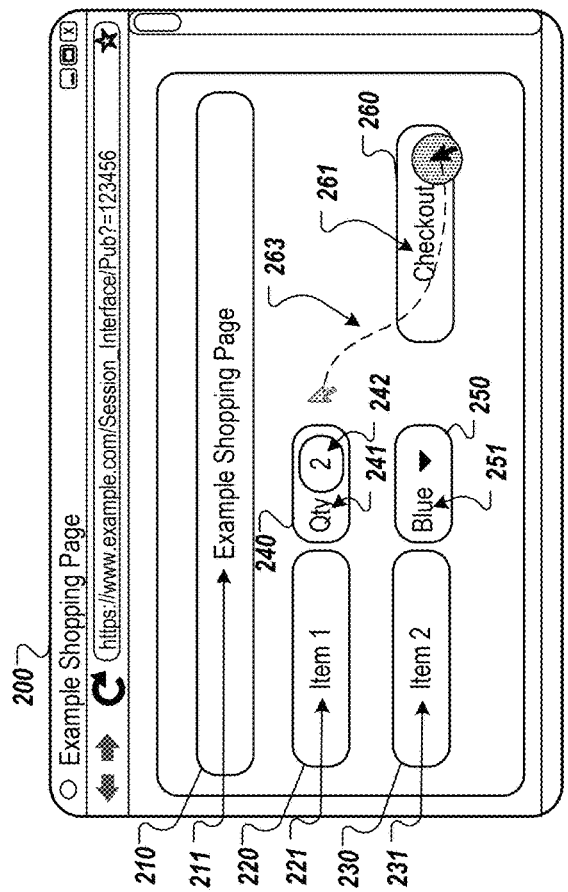
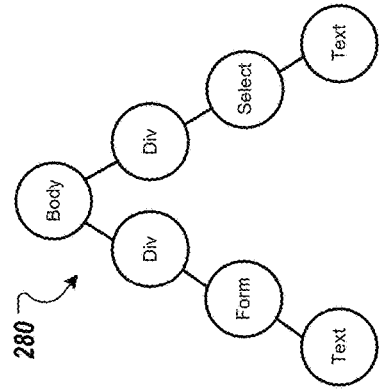
FIG. 2A
FIG. 2B
FIG. 2C

▲ Alerts

| NOTIFICATION | CONFIGURED ALERTS (4/50) |
|---|---|
| Privacy Adviser We recommend changes to your recording settings | |

Privacy Adviser

Permissive AJAX Requests
We've detected that you're recording all request body fields without restriction

| URL PATTERN | REQUEST BODY | RESPONSE BODY |
|---|---|---|
| /data | recorded | recorded |

Review your API integrations to ensure you're not recording sensitive data. Learn More

CSS Selector Complexity — 512
We've detected complex CSS selectors in your excluded elements.

.row>.col-xs-6>.row-9>.col-10>.form-control.input-excluded .input-sm[type="text"]

Consider adding the .fs-block class into your HTML. Learn More

Potentially sensitive data is being recorded — 515
We've detected data that might need to be excluded. Please review the following session to verify:

☻ User 25  ▲  January 21, 5:15 pm   2 sessions
  SINCE JAN 15     255 Events 1:16:12  127.0.0.1

514

Potentially sensitive data is being recorded

We've detected data that might need to be excluded. Please review the following session to verify:

610

▲ User 23906  SINCE 11/7/18  12:14 pm · 8 sessions  56 EVENTS · 27:37 · Application A ▲ User 25286  SINCE 11:56 AM  11:56 am · New visitor!  3 EVENTS · 0:00 · Application A ▲ User 24909  SINCE FEB 15  11:47 am · 1 session  4 EVENTS · 45:41 · Application A

PROACTIVE PRIVACY IN USER INTERFACE SESSION PLAYBACK USING SENSITIVE DATA DETECTION

CROSS-REFERENCE TO RELATED APPLICATIONS

This application claims the benefit under 35 U.S.C. § 119(e) of U.S. Patent Application No. 63/352,435, filed Jun. 15, 2022. The disclosure of the foregoing application is incorporated herein by reference in its entirety for all purposes.

BACKGROUND

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to resources or application pages (e.g., by interacting with an embedded link), and change visual aspects of the user interface (e.g., rotating a device, resizing a window, scrolling to other portions of a document, or using zoom controls).

As user satisfaction with a given website or application can depend on the user's experience with the user interface, user sessions with user interfaces can be recorded and played back to publishers. Some user interfaces, such as user interfaces of banking web pages or applications, present private data or other private content of the users who are interacting with the user interfaces. As this content is typically not useful in assessing the quality and functionality of the user interfaces and should not be presented to other parties, care should be taken to ensure that such content is not part of the playback.

SUMMARY

In general, one innovative aspect of the subject matter described in this specification can be embodied in methods that include receiving, from a client device at which a user session with one or more user interfaces occurs, event data related to the user session; detecting potentially sensitive data in the event data; generating and displaying playback of the user session using the event data including, displaying, within the playback of a particular user interface that includes a user interface element that displayed the potentially sensitive data, a sensitive data indicator that indicates that the user interface element includes the potentially sensitive data, and displaying a user interface control that enables a user to select whether to prevent data that is displayed by the user interface element from being displayed during playback of user sessions with user interfaces that include the user interface element, receiving data indicating a selection to prevent that data that is displayed by the user interface element from being displayed during playback of user sessions with user interfaces that include the user interface element; and in response to receiving the data indicating the selection, updating a set of privacy rules to prevent the data that is displayed by the user interface element from being displayed during playback of user sessions with user interfaces that include the user interface element. Other embodiments of this aspect include corresponding methods, apparatus, and computer programs, configured to perform the actions of the methods, encoded on computer storage devices.

These and other embodiments can each optionally include one or more of the following features. In some aspects, updating the privacy rule includes updating the privacy rule to (i) mask the data that is displayed by the user interface element before sending the data from user devices or (ii) block the data that is displayed by the user interface element from being sent from user devices. The user interface control enables the user to define the potentially sensitive data as safe.

Some aspects include displaying, during playback of the user session, a timeline interface that includes a timeline of the user session and a second sensitive data indicator that indicates, within the timeline, a time at which the potentially sensitive data is shown in the playback of the user session.

Some aspects include displaying, with the playback of the user session, a session activity region that includes event elements for events that occurred during the user session, wherein the event stream includes a highlighted event element for the potentially sensitive data. User interaction with the highlighted event element causes display of (i) the potentially sensitive data and (ii) the user interface control that enables the user to select whether to prevent data that is displayed by the user interface element from being displayed during playback of user sessions with user interfaces that include the user interface element.

In some aspects, detecting the potentially sensitive data in the event data includes detecting the potentially sensitive data using data loss prevention techniques to classify data of user sessions as safe or potentially sensitive. In some aspects, detecting the potentially sensitive data in the event data includes providing the event data as input to a machine learning model trained to output a classification of data into multiple categories related to levels of sensitivity of the data. The categories of sensitivity include (i) potentially sensitive (ii) and safe. Some aspects include updating the machine learning model based on user interactions with the user interface control for multiple pieces of potentially sensitive data and respective potentially sensitive data for each user interaction.

Particular embodiments of the subject matter described in this specification can be implemented so as to realize one or more of the following advantages. The techniques described in this document protect users' privacy by preventing content, e.g., private or sensitive content, from being collected from the devices of the users while still collecting enough information to generate playback of user sessions that accurately reflects the way in which the user interface(s) was presented and the changes to the user interface(s) that occurred during the user sessions. Potentially sensitive data can be detected in data related to user sessions with user interfaces and highlighted during the playback of the user sessions so that publishers, administrators, and/or others authorized to adjust rules (which can be referred to as administrators for brevity) can adjust privacy rules that control what data is collected and/or show during playback of user sessions. The system can update rules based on administrator input at the playback user interface, which makes rule modification easier, more efficient, and more accurate relative to systems that require administrators to manually define the rules. For example, the session playback user interface can include controls that enable the administrators to view potentially sensitive data and define the potentially sensitive data as safe or instruct the system to exclude the potentially sensitive data, e.g., if the data is sensitive. If the administrators elects to exclude the data, the system can automatically modify or add a rule that prevents (or delete a rule than enabled) the collection and display of the data within a user interface element. In this way, the data shown by the user interface element will be blocked or masked in the playback of user sessions that include the user interface element and that may show similar potentially sensitive data. In addition, such data may be blocked from being sent for user devices to the system that generates and displays playback of user sessions.

Machine learning techniques can be used to improve the accuracy in detecting potentially sensitive data. For example, a machine learning model can be trained and updated based on user interactions with the controls for defining potentially sensitive data as safe or excluded.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A and 5B are illustrations of example interfaces that notify a user about potentially sensitive data.

FIG. 6 is an illustration of a notification message that notifies a user about potentially sensitive data.

Like reference numbers and designations in the various drawings indicate like elements.

DETAILED DESCRIPTION

Figure 1:
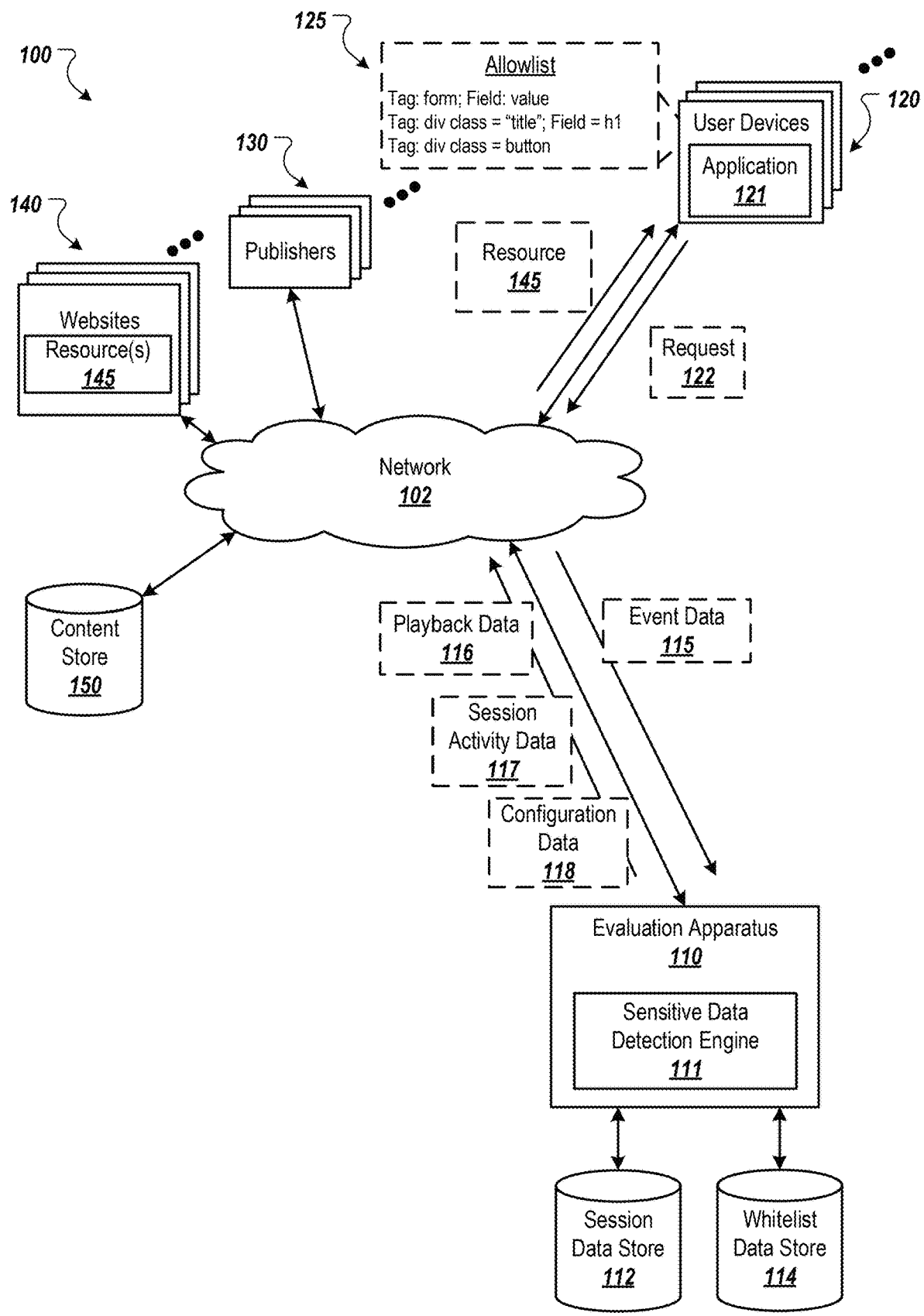
FIG. 1 is a block diagram of an example environment in which users interact with user interfaces.

The techniques described in this document allow publishers to improve their user interfaces (e.g., a web pages or application interfaces) so that users have a positive experience interacting with the user interfaces while also protecting the privacy of the users that view and interact with the user interfaces. As the need to protect user privacy has become a growing concern, these techniques are vital in any technology that touches user data. The techniques described in this document prevent user data from ever being collected or transferred from a user device (or at least masked before transmission), ensuring that the data cannot be intercepted during transmission or stolen from another device. At the same time, very specific data, such as data related to the structure of the user interface and the size of elements presented in the user interface, can be collected to recreate user sessions that accurately reflect the user interfaces presented to the users, the changes to the user interfaces that occurred during the user sessions, and the user interactions that occurred during the user sessions without showing actual user data.

For example, a website or mobile application of a bank shows customers their balances, transactions, and other data that is private to the user. The actual text showing the transactions and balances is not required in assessing the quality of the website or application and the customers would prefer that such data is not shared with a third party that collects user interface data for playback and analysis. The techniques described in this document prevent such data from being collected and replaces the data in playbacks such that the playbacks accurately reflect the user interfaces viewed by the customer, but without the user's actual data.

The techniques also give publishers fine-tuned control over what data is collected during user sessions with their user interfaces. A publisher can easily select content to be collected or blocked simply by interacting with (e.g., selecting) the content during playback. For example, if a retailer decides that it wants to view the quantity of items placed in a virtual shopping cart to view how users interact with a quantity selector and to assess the functionality of the quantity selector, the retailer can simply select the quantity selector during playback of one of the user sessions. When another customer subsequently views the same web page or application page, the quantity of items selected using the quantity selector will be recorded for playback of that user session. The retailer can later stop the collection of the quantities simply by interacting with (e.g., selecting) the quantity selector again during the playback of a user session. This can all be handled on the back end (e.g., at the server) without the retailer having to make any programmatic changes to the web page or application.

Publishers (e.g., an entity that provides user interfaces, such as web pages and/or application interfaces) generally want to make user interfaces user friendly so that users will have a positive experience. Having information about user interactions with a given user interface (e.g., a web page or an application interface) and events that occur during user sessions with user interfaces can help a publisher quickly identify aspects of the user interfaces that can be changed to improve the user experience. These aspects can be identified using actual user interactions with the user interface, thereby eliminating the need to conduct external user surveys or rely on subjective feedback about the user interface. Rather, the users' actual recorded interactions with the user interface and/or classifications of these user interactions based on the characteristics of the interactions reveal areas of the user interface that can be changed to improve the user experience.

This document describes techniques for preventing the collection of specified content, e.g., content that may include sensitive or private data. This content can be replaced in the playback of a user session with content having the same size such that the user interface(s) presented in the playback reflect the user interface(s) presented during the actual user session. For example, if the size of an element used to replace text is larger than the actual text, this can cause other user interface elements to be presented incorrectly, e.g., on top of one another or in incorrect locations on screen.

The techniques described in this document also detect and highlight data that has been collected, but may be sensitive. For example, publishers can define rules that allow for the collection of specific data considered to be safe and not sensitive. A rule can specify that data entered into a text entry field can be collected and displayed during playback of user sessions. However, a user may still enter data that may be considered sensitive into the text entry field. A sensitive data detection engine can evaluate event data received from user devices to determine whether the data may be sensitive such that the publisher can prevent such data from being collected and presented in the future. As described in more detail below, the sensitive data detection engine can use data loss prevention techniques and/or machine learning techniques to evaluate the event data.

Interactive interfaces that display the playback of user sessions can indicate data in the user sessions that is potentially sensitive, e.g., as determined by the sensitive data detection engine. For example, the interfaces can display sensitive data indicators that indicate where the potentially sensitive data may be displayed while not actually displaying the potentially sensitive data unless authorized by the administrator viewing the playback of the user session. The interactive interfaces can also include controls that enable an administrator to indicate whether the potentially sensitive data is actually sensitive data. The controls can also enable the administrator to block the collection of and display of the potentially sensitive data. For example, the controls can enable the administrator to modify a privacy rule that previously enabled the collection of the potentially sensitive data to no longer allow collection of the data from user devices. The system can update the rule automatically in response to user interaction by the administrator with the control.

The techniques described in this document can reduce the probability of data leaks (e.g., potentially sensitive data being collected from user devices), reduce the time it takes to detect data leaks, identify the precise origin of the data leaks (e.g., URL, log, user interface element), and enable efficient management of detected data leaks (e.g., by modifying privacy rules to prevent future data leaks and/or reducing false positives).

FIG. 1 is a block diagram of an example environment 100 in which users interact with user interfaces. The example environment 100 includes a network 102, such as a local area network (LAN), a wide area network (WAN), the Internet, or a combination thereof. The network 102 connects user devices 120, publishers 130, websites 140, and an evaluation apparatus 110. The example environment 100 may include many different user devices 120, publishers 130, and websites 140.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 102. A resource 145 is identified by a resource address that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 120, which is also referred to as a client device, is an electronic device that is capable of requesting and receiving resources over the network 102. Example user devices 120 include personal computers, mobile communication devices (e.g., tablet computer, smartphone, wearable device, etc.), and other devices that can send and receive data over the network 102. A user device 120 typically includes one or more user applications 121, such as a web browser and/or native applications, to facilitate the sending and receiving of data over the network 102. A native application is an application developed for a particular platform or a particular device. Publishers 130 can develop and provide the native applications to the user devices 120. For example, users can download the native applications to their user devices 120.

A user device 120 can submit a resource request 122 that requests a resource 145 from a website 140. In turn, data representing the requested resource 145 can be provided to the user device 120 for presentation by a web browser of the user device 120. The requested resource 145 can be, for example, a home page of a website 140, a web page from a social network, or another resource 145. The data representing the requested resource 145 can include data that causes presentation of content (e.g., embedded content such as text that is included in the code of the resource) at the user device 120. The content can include individual content items, such as individual images, buttons, icons, logos, groups of text, or other unit of content.

The data representing the requested resource 145 can also include instructions that cause the user device 120 to request remote content from a content store 150. The remote content can include, for example, images, content that is updated periodically, content used across multiple different resources, or content provided by third parties (e.g., other than the publisher). Thus, the remote content can be updated or changed without having to update the resource code.

A native application can also present content with or without the user device 120 submitting a request for the content. For example, some native applications, e.g., games, can present content stored at the user device 120 without requiring a request for content. Other native applications, e.g., news applications, can request and present content obtained from an application server maintained by the publisher 130 of the native application.

The evaluation apparatus 110 generates and provides, to devices of the publishers 130, interactive interfaces that present playback of user sessions with user interfaces of the publishers 130. To generate the interactive interfaces, the evaluation apparatus 110 collects event data 115 from the user devices 120. As used throughout this document, the phrase event data refers to data obtained from a user device 120 during a user session. A user session is a period of user interaction with one or more user interfaces, e.g., of a website or native application, of a publisher 130. In the context of a website, the user session can begin when a user requests a first resource from a given domain (e.g., example.com) and can end when a session end condition is met. In the context of a native application, the user session can begin when the user launches the native application and can end when a session end condition is met. The session end condition can be considered met when a specified amount of time elapses since a user interaction with a resource from the given domain or the native application. For example, if a user has not interacted with a resource from the given domain or the native application for 30 minutes (or some other amount of time), the session end condition can be considered to be met, thereby ending the session.

The session end condition can also be considered met when a session termination event occurs. The session termination event can be, for example, receipt of a session end message indicating that the user navigated away from the given domain or closed the browser, or a message specifying that the user closed the native application. Note that the session termination event may be stored at the user device 120 for some time (e.g., until the user reopens the browser or again launches the native application) prior to the user device 120 submitting the session end message to the evaluation apparatus 110.

The application 121 (e.g., a web browser or native application) can be configured to collect and send event data 115 related to the application 121 to the evaluation apparatus 110. For example, a publisher 130 can obtain computer-readable code from a third party that manages the evaluation apparatus 110 and install the code in a website or native application. The code can be in the form of an application programming interface (API), library, software development kit (SDK), code that launches an instrumentation module, or other code capable of collecting (or causing the application 121 to collect) data and send the data to the evaluation apparatus 110. As described below, the application 121 can be configured to access an allowlist 125 to determine what content can be collected and sent to the evaluation apparatus 110. The allowlist identifies content that can be collected (e.g., that is safe to capture) from user devices and sent to the evaluation apparatus 110. A blocklist identifies content that cannot be captured (e.g., content that is not safe) from user devices and sent to the evaluation apparatus 110.

The event data 115 can include data that can be used to generate playback of the user session. Rather than recording a video of the user session, the application 121 can collect event data 115 that is used to recreate the user session, e.g., create a playback of the user session. This reduces the amount of data that the user device 120 stores and sends over the network 102, reducing bandwidth consumption, data usage of a mobile device, and/or reduces the consumption of limited memory of the user device 120.

The event data 115 can be streamed from the user device 120 during a user session or collected at the user device 120 and sent to the evaluation apparatus 110 after the user session ends or periodically during the user session. The event data 115 can include interface data, user interaction data, and/or mutation data. The interface data specifies a structure of a user interface that is presented at a user device during the session. For example, when the user device 120 renders a resource, the interface data can be an initial Document Object Model (DOM) of the resource that is first presented at a user device 120. In this example, the DOM would specify that the resource is initially presented. For native applications, the interface data can include a tree structure that specifies a hierarchy of objects presented by the user interface of the native application.

The user interaction data specifies user interactions at the user device, and includes user interactions with the elements of the user interface. The user interaction data can specify mouse movements, user clicks, mouse hovers, highlights, text inputs, and any other user interactions that are performed at the user device. The user interaction data specify user interactions at the user device, and include user interactions with the elements of the user interface. The user interaction data can specify mouse movements, user clicks, mouse hovers, highlights, text inputs, and any other user interactions that are performed at the user device. For example, assume that a user clicks on an item in a list, in this example, the user interaction data will specify that a user click occurred and identify the element of the user interface that was clicked.

The user interaction data for an element with which a user interacted can identify the element using a unique identifier for the element. The identifier for an element can be in the form of an alphanumeric sequence that is unique for each user interface element. For resources that include a DOM, the resource identifier can be the identifier for an object, e.g., obtained from the DOM id property. This enables the evaluation apparatus 110 to aggregate the number of user interactions with each user interface element across multiple user sessions of multiple different users.

The user interaction data can also include timestamp information and/or sequential numbering information specifying when each user interaction occurred so that the user interaction data can be coordinated with other data. For example, the user interaction data can specify an absolute time at which a given user interaction occurred and/or a number representing when a given user interaction occurred relative to other user interactions a set of user interactions (e.g., user interaction 50 out of 150 total user interactions).

The user interaction data can be obtained, for example, by inserting an interaction tracking script in the code of the resource (or native application). The interaction tracking script will monitor mouse movement, clicks, and other user actions. In the context of a tablet or other touchscreen device, the interaction tracking script monitor user taps, swipes, pinches, and other user interactions with the touchscreen device. For some native applications, the user interaction data can be obtained using reflection techniques to determine which user interface elements are interacted with, as described in U.S. patent application Ser. No. 16/038,002, filed on Jul. 17, 2018, entitled "Capturing and Processing Interactions with a User Interface of a Native Application," which is herein incorporated by reference. For some native applications, user interaction data can be obtained by swizzling methods that detect user interactions, as described in U.S. patent application Ser. No. 16/370,574 filed on Mar. 29, 2019, entitled "Capturing and Processing Interactions with a User interface of a Native Application," which is herein incorporated by reference.

Using these techniques, the user interaction data can specify the actual user interface element interacted with based on the current structure of the DOM or view tree used to generate the user interface. This allows the data to specify the actual element event for dynamic user interfaces for which the structure can change and/or new elements can be presented by the user interface. For example, if a pop up window is presented, e.g., based on a script or in response to a user interaction, and element of the pop up window is interacted with, the interaction data can specify the element of the pop up window with which the interaction occurred as this data would be part of the DOM structure or the view tree of a native application.

The mutation data can specify each element that is rendered by the user device 120, and the mutation data can be provided to the evaluation apparatus 110 (e.g., either sequentially or in sets of mutation data that were accumulated over a specified time by the user device 120). Using the mutation data, the evaluation apparatus 110 can reconstitute the DOM in a manner similar to that performed by a browser. The mutation data can be obtained, for example, by inserting a mutation observer script in the code of the resource (or native application). The mutation observer script can monitor the resource for changes to the structure of the resource, record mutation data representing the changes in local memory at the user device 120, and provide the mutation data to a specified location (e.g., the evaluation apparatus 110). Providing mutation data rather than recorded video of the user session reduces the amount of data that has to be recorded and transferred across the network 102. This limits the negative latency impact and bandwidth consumption of this technology.

The mutation data specifies changes to the structure of the user interface that occur during a user session. For example, assume that a user clicks on an item in a list, which causes a first image to be replaced by a second image. In this example, the mutation observer script can detect the removal of the first image and the addition of the second image in the user interface, and store mutation data at the user device 120 specifying that the first image was removed from the user interface and that the second image was inserted into the user interface. Alternatively, or additionally, the mutation data can directly specify the replacement of the first image by the second image (e.g., rather than specifying both the remove mutation and the add mutation). Periodically, the user device 120 can upload (or otherwise transmit) the mutation data to the evaluation apparatus 110, which processes the mutation data as described in more detail below. Example techniques for obtaining event data and using the data to generate and present playback of user sessions are described in U.S. Pat. No. 9,766,769, filed on Dec. 31, 2014, entitled, "Evaluation of Interactions with a User Interface," and U.S. patent application Ser. No. 16/038,002, filed on Jul. 17, 2018, entitled "Capturing and Processing Interactions with a User Interface of a Native Application," which are herein incorporated by reference.

In some implementations, the application 121 only provides, with the event data 115, content that is specified by the allowlist 125. That is, the application 121 excludes content that does not match allowlisted content specified by the allowlist 125. For example, the mutation observer script and/or other scripts or code used to collect and send data to the evaluation apparatus 110 can be configured to exclude content that is not included in the allowlist 125 from being provided to the evaluation apparatus 110. For ease of subsequent discussion, such code is collectively referred to as the application 121.

The allowlist 125 can specify user interface elements from which content (e.g., text, tables of text, images, videos, etc.) can be collected and provided to the evaluation apparatus 110. The user interface elements can be defined based on the structure of the document or code used to generate the user interfaces. For example, if the user interface is generated using an HTML document, an extensible Markup Language (XML) document, or a DOM that represents the document, the allowlisted user interface elements can be defined by nodes, tags, fields within tags, or attributes within tags. For example, the allowlist 125 can specify particular tags, fields, attributes, or other structural elements of the DOM from which content can be uploaded to the evaluation apparatus 110.

The allowlist 125 can include privacy rules that define from which user interface elements the application 121 can obtain the content and provide the content to the evaluation apparatus 110. If the application 121 encounters, during collection of event data for a user session, user interface elements for which the allowlist does not include a corresponding rule, the application 121 may not provide the content within that structure element to the evaluation apparatus 110. Instead, the application 121 can provide structural data, e.g., the size of an element that includes that user interface element, so that a masking element can be presented during playback in place of the actual content. In this way, the playback can be generated without the actual content, but such that the size of the elements are correct during playback and content is not shifted into other places on screen that do not match the actual location during the user session.

In a particular example, the allowlist 125 specifies that content within the "value" field of "form" tags can be collected and uploaded to the evaluation apparatus 110. Content within other fields of the form tags will be excluded from the event data 115 as those fields are not included in the allowlist 125.

The publishers 130 can specify the allowlist 125 for their user interfaces. For example, a publisher 130 can select the user interface elements from which content can be collected and provided to the evaluation apparatus 110 from user devices 120. In some implementations, the publisher 130 can generate an allowlist for its user interfaces and provide the allowlist to the evaluation apparatus 110. A publisher 130 can also specify user interface specific allowlists. For example, the allowlist for a home page can be different from the allowlist for an account overview page. As described in more detail below, the publisher 130 can generate and update its allowlist by interacting with the playback of user sessions with its user interfaces.

The allowlist 125 can specify allowlisted user interface elements at different levels of granularity. For example, the allowlist 125 for a publisher 130 can specify that content from within form tags can be collected and provided to the evaluation apparatus 110. The allowlist 125 can also specify that only content within a particular field (e.g., the h1 field) of a particular class (e.g., the "Title" class) can be collected and provided to the evaluation apparatus 110. In this example, if the particular class includes other fields, the content within those fields will be excluded from the event data 115 and not provided to the evaluation apparatus 110.

In some implementations, a blocklist can supersede the allowlist. For example, if a blocklist specifies that content within a particular class cannot be collected and sent to the evaluation apparatus 110, the application 121 will not send content included in the class even if the class includes tags and/or fields in the allowlist 125. Each publisher 130 can specify one or more allowlists and one or more blocklists for its user interfaces.

When collecting and generating the event data 115 for a user session, the application 121 can compare presented user interface elements that were presented during the user session to the allowlisted user interface elements specified by the allowlist 125. For example, the application 121 can compare the tags that define a presented used interface element to the tags of the allowlisted user interface elements. If there is a match and the allowlist 125 does not specify particular fields, the application 121 can include the content in the event data 115 send to the evaluation apparatus 110. If the allowlist 125 specifies particular fields or particular attributes, the content is only included in the event data 115 if the content is within the particular fields or particular attributes.

In a particular example, the event data 115 can include a series of data items, e.g., tokens. The interface data can include, in the series of data, the tags, fields, attributes, etc. and their content of the initial DOM. Similarly, the mutation data can include, in the series of data, the tags, fields, attributes, etc. and their content of any changed portion of the DOM. The application 121 can compare the tags, fields, attributes, etc. in the series of data items to the allowlist. If content in the series of data items does not match the allowlist, the application 121 can remove the content from the event data 115 before the event data 115 is sent to the evaluation apparatus 110.

In some implementations, some content can be sent to the evaluation apparatus 110 without being compared to the allowlist. For example, programmatic elements, such as style fields, include data that can be used to generate accurate playback of a user session but would not include sensitive or private data. Such data can be sent to the evaluation apparatus 110 without being on the allowlist 125. For example, the application 121 can be configured to collect the text within a set of programmatic elements and include the text in the event data 115.

The evaluation apparatus 110 can store the allowlists 125 in an allowlist data store 114. When a user interface of a publisher 130 is loaded at a user device 120, the application 121 can request configuration data 118 that specifies the allowlist for the publisher 130. For example, the code installed on the website or within the native application can cause the application 121 to request the configuration data 118 from the evaluation apparatus 110. In response, the evaluation apparatus 110 can obtain the current allowlist 125 for the publisher 130 from the allowlist data store 114 and provide configuration data 118 that specifies the allowlist 125 to the user device 120. In this way, the application 121 can use the most current allowlist 125 for each user session without the publisher 130 having to make any programmatic changes to the application 121 or user interfaces for each update to the allowlist 125.

The event data 115 can be transmitted to the evaluation apparatus 110 in one or more data transmissions. For example, each type of event data 115 can be sent separate from each other type of event data. In another example, the event data 115 for each page can be transmitted to the evaluation apparatus 110 after the page is loaded on the user device 120.

The evaluation apparatus 110 receives the event data 115 from the user device 120 and stores the event data 115 in a session data store 112. For example, the evaluation apparatus 110 can store the event data 115 in an index of session data that is stored in the session data store 112. The index of session data can include, for each user session, the event data 115 received for that user session and optionally additional data, such as context data relating to user device 120 (e.g., the type of user device 120, the make and model of the user device 120, hardware and/or software of the device, the geographic location of the device, etc.). The software specified by the context data can include the type of browser, version of the browser, or other data about the browser.

The evaluation apparatus 110 can index the event data 115 and the contextual data in the session data store 112. This enables a user to search for user sessions that include particular events or attributes and/or filter user sessions based on the events or attributes. For example, the evaluation apparatus 110 can receive a query for one or more attributes, e.g., a type of browser and type of event (e.g., one or more rage clicks) that occurred during the user session. The evaluation apparatus 110 can use the index to identify each user session that occurred using the type of browser specified by the query and during which an event of the type specified by the query occurred. The evaluation apparatus 110 can then provide data that presents the identified user sessions in an interactive interface.

The evaluation apparatus 110 can, for each user session, use the event data 115 for the user session to generate playback of the user session (which can be stored and transmitted as playback data 116) and session activity data 117 for the user session. The evaluation apparatus 110 provides the playback data 116 and the session activity data 117 to the publisher 130 that provides the user interface(s) presented during the user session.

The playback of the user session presents the user interface(s) that were presented during the user sessions, visual changes to the user interface(s) that occurred during the user session, and user interactions (e.g., mouse movements) with the user interface(s) that occurred during the user session. At least a portion of the visual changes to the user interface(s) correspond to the mutation data for the user session. For example, the playback of the user session can show the publisher 130 the mouse movement over a user interface, a click on an item presented in a user interface, etc.

The playback of the user session can also present the content of presented user interface elements that were included in the event data 115 based on the presented user interface elements matching allowlisted user interface elements specified by the allowlist 125 for the publisher 130. For user interface elements that were not included in the event data 115 based on the user interface elements not matching allowlisted user interface elements, the playback can present a masking element that represents the content of the user interface element. In a particular example, the user interface can resemble a wireframe of the user interface, e.g., none of the user interface elements are allowlisted.

For example, if the content is an image, a blank box that represents the image can be presented in the playback of the user session. The blank box that represents the image can be the same size as the image (e.g., the same height and width) and be presented in the same location within the user interface as the image. In this way, the playback accurately reflects how the non-allowlisted image was presented in the user interface.

If the content is text, a bar or other masking element can be presented to represent the text. For example, a bar having rounded edges can be presented in the same location and with the same size as the text that the bar is representing. Using such a bar rather than using an algorithm that replaces the text prevents the ability to reverse the replacement and determine what the text was actually presented. In addition, the bar can be sized to the actual text more accurately than replacement text based on the differing widths of text characters. For example, if wider characters are used to replace thinner characters, the overall width of a replacement string of text would be larger than the overall length of the actual text, causing the replacement text to not accurately reflect the text that was presented during the user session. Such replacement text may be presented over other objects in the playback, causing shifting of other user interface elements during playback, or cause other errors in the playback such that the playback may not be as useful in assessing the quality of the user interface.

To determine the size of non-allowlisted content, the application 121 (or the evaluation apparatus 110) can measure the size of each portion of non-allowlisted content as it is presented in the user interface. However, measuring the size of objects can be computationally expensive. If the non-allowlisted content is the only content of a user interface element, the evaluation apparatus 110 can size the masking element for the content based on the size of the object that includes the content. For example, if non-allowlisted text is included in a button, the evaluation apparatus 110 can size the masking element based on the size of the button, e.g., to fit within the button.

Some user interface elements can include both allowlisted and non-allowlisted content. For example, a block of text can include multiple fields, one being a title for the block and another being account information of a user. In this example, the title fields may be included in the allowlist, e.g., in the form of a rule, and the account information fields may not be in the allowlist. In this example, the masked portion for the account information may take up an unknown portion of the block of text since the actual text is not provided. For example, the account information can vary from person to person. To size a masked element for the block of text appropriately, the application 121 can record the size of the block of text and provide that information to the evaluation apparatus 110.

At playback time, the evaluation apparatus 110 can determine the size of the masking element based on the size of the block of text. As the contribution to the location and size of the block of text made by the text in title is known based on the actual text being sent from the application 121 to the evaluation apparatus 110, the evaluation apparatus 110 can size the masking element based on the remaining area of the block of text and optionally the location of the two portions of text. For example, if the account information is below the title and the title occupies the top half of the block of text, the evaluation apparatus 110 can size the account information masking element to fill the bottom half of the block of text.

In some cases, changes to a user interface or the structure of the user interface can cause changes in the sizes of content presented by the user interface. For example, a change in a class can result in a change in a style element which results in a change in the size of a user interface element. To detect changes in the size of user interface elements, the application 121 can use the ResizeObserver API (or other appropriate code) in supported browsers. The ResizeObserver API detects and reports changes to the rectangle in which the content of an element can be placed. The application 121 can include data reported by the ResizeObserver API in the event data 115. The evaluation apparatus 110 can use the data specifying the new size of the element to resize the content of the element in the playback of the user session.

For browsers that do not support the ResizeObserver API, the evaluation apparatus 110 can generate a hierarchical graph of user interface elements that represents the user interface elements that can cause changes in the size of other user interface elements. The evaluation apparatus 110 can generate the graph using the DOM of the user interface. The size of a first user interface element (e.g., child node) that is nested within a second user interface element (e.g., parent node or grandparent node) can be affected by changes to the second user interface element. The evaluation apparatus 110 can detect changes to user interface elements based on the mutation data included in the event data 115. If a user interface element that could impact non-allowlisted content is changed, the evaluation apparatus 110 can measure the size of the user interface element that includes the non-allowlisted content. If the size has changed, the evaluation apparatus 110 can change the size of the non-allowlisted content at the corresponding time in the playback of the user interface.

This graph can also be used to determine which elements to measure the size of for the purpose of sizing non-allowlisted content. For example, the application 121 or the evaluation apparatus 121 can measure the size of each user interface element corresponding to the parent node of non-allowlisted content, without measuring the size of the user interface elements corresponding to other nodes.

The session activity data 117 can present to the publisher 130 a list of events that occurred during the user session. As playback of the user session is presented, (e.g., showing mouse movements and visual changes), the list of events can be highlighted to show which event corresponds to the visual changes that are being presented in the playback.

The evaluation apparatus 110 includes a sensitive data detection engine 111, which is also referred to herein as detection engine 111 for brevity. The detection engine 111 is configured to evaluate the event data for user sessions to identify potentially sensitive data in the event data. If found, the evaluation apparatus 110 can indicate the potentially sensitive data during playback of user sessions and/or send notifications to administrators that have authority to adjust privacy rules to prevent collection and display of sensitive data during playback of user sessions), as described below.

In general, the privacy rules are tools that are used to avoid collecting potentially sensitive data at the evaluation apparatus 110. However, the privacy rules may not be configured or implemented correctly and/or the names of user interface elements can change over time, resulting in some potentially sensitive data reaching the evaluation apparatus 110. The detection engine 111 can detect such potentially sensitive data and alert administrators to the detected potentially sensitive data, which can be referred to as data loss.

In some implementations, the detection engine 111 uses data loss prevention ("DLP") techniques to identify potentially sensitive data. DLP software can be used to detect potential data breaches, data loss, and potentially sensitive data. The detection engine 111 can provide event data for each user session as input to DLP software to determine whether any content within the event data is potentially sensitive. If the DLP software classifies content or other data as sensitive, the detection engine 111 can classify the data as potentially sensitive so that the evaluation apparatus 110 can indicate that the data is sensitive during playback and/or notify administrators using push notifications, e.g., e-mails.

To reduce the number of times the detection engine 111 interacts with the DLP software, the detection engine 111 can check a cache of evaluated expressions to determine whether the data to be checked has already been evaluated by the DLP software. If so, the detection engine 111 can use the previous classification for the data stored in the cache. If not, the detection engine 111 can send the data to the DLP software for evaluation.

The data stored in the cache can be keyed off of the element identifier for the user interface element that includes the data, the URL of the user interface that includes the user interface element, or a selector path (e.g., a CSS selector path) to the user interface element.

Data can be stored in the cache for a duration that is based on the classification of the data. For example, data that the DLP software classifies as sensitive can be stored in the cache for longer durations than data classified as being safe. In this way, the safe data is evaluated more often in case the DLP software later considers the safe data to be sensitive.

In some implementations, the detection engine 111 uses heuristic techniques to detect potentially sensitive data in the event data. For example, the detection engine 111 can compare text content to expressions that are considered safe and/or expressions that are considered sensitive. In this example, the detection engine 111 can classify text as safe if the text is similar (e.g., has at least a threshold similarity to) one or more safe expressions or if the text is not similar (e.g., has less than a threshold similarity to) each sensitive expression. In another example, the detection engine 111 can classify text as sensitive if the text is similar (e.g., has at least a threshold similarity to) one or more sensitive expressions or if the text is not similar (e.g., has less than a threshold similarity to) each safe expression.

In another example, the detection engine 111 can use the heuristics to evaluate the structure of text to classify the text as safe or potentially sensitive. For example, some sensitive data, such as addresses, credit card numbers, dates, and domain names have similar structure. If text in the event data is similar to the structure of a type of sensitive data, the detection engine 111 can classify the text as potentially sensitive.

In some implementations, the detection engine 111 can be configured to reduce the occurrences of false negative (e.g., classification of sensitive data as safe) and/or false positives (e.g., classification of safe data as potentially sensitive data). For example, the detection engine 111 can include a list of safe words or expressions that the detection engine 111 should not classify as sensitive and/or a list of sensitive words that the detection engine 111 should classify as sensitive.

In some implementations, the detection engine 111 can use one or more machine learning models to classify data of event data as potentially sensitive. A machine learning model can be trained to classify input data within a set of levels of sensitivity, e.g., safe, potentially sensitive, and sensitive. Other levels or classifications can also be used.

The machine learning model can be trained using labeled training data. The labeled training data can include a set of data and, for each piece of data, a label that indicates its level of sensitivity. Various types of machine learning models and training techniques can be used, such as neural networks, decision trees, a gradient boosted decision trees, etc.

The evaluation apparatus 110 can update the machine learning model based on feedback received from administrators. For example, as described in more detail below, an administrator can be presented with a control that enables the administrator to indicate whether data that has been classified as being potentially sensitive is safe or sensitive. The evaluation apparatus 110 can use this as labeled training data to update the machine learning model, e.g., using online machine learning techniques. In this example, the label would be the administratorclassification of the data.

In some implementations, the evaluation apparatus 110 uses the detection engine 111 to detect potentially sensitive information when collecting event data, generating events that are stored by the evaluation apparatus 110, and indexing the events. The evaluation apparatus 110 can generate various types of events that are stored and that enable searching for user sessions and/or generating analytics for various types of events.

One example event type is a dataloss event. The dataloss event can include two pieces of information, a data type and a source. The type describes what kind of data was found—e.g., email, payment-card number, social-security number, etc. The source describes where the data was found—e.g., in a document element, a request URL, log message, and so forth.

In addition to the source, the dataloss events can provide additional, source-specific, "origin" information for context. For example, an ELEMENT source can contain a selector (e.g., a CSS selector) specifying which element is involved. A NETWORK_REQUEST_HEADER source can contain both the URL of the specific network request and, when available, the path of the associated JSON value. The purpose of this information is two-fold: it will allow publishers to quickly identify the source of the purported data leak, so they can correct it, or decide the data isn't actually sensitive and can ignore it easily using these values to specify which events to ignore.

The dataloss events can be indexed similar to other types of events, with fields for type, source, and origin. The indexing allows for queries that support a management user interface.

The dataloss events can serve as an aggregate signal of likely data leaks. While each individual event may not represent an actual issue, in aggregate they are more likely to. For example, a few instances of a number in a specific field, that happens to pass the payment-card checksum, likely isn't a problem. But the vast majority of numbers in the same field passing this check probably does represent a leak.

Thus, the purpose of an event is not to be absolutely correct. This is not even feasible in most cases (e.g., roughly 10% of 15-16 digit numbers will pass the Luhn check used to verify them). But identifying and aggregating their origins (e.g., "this number usually passes the check and always shows up in the element form.checkout>input.ccn") allows publishers to identify and manage potential leaks at a higher level of abstraction.

This also for the implementation of useful leak detectors, with fundamentally lower confidence, such as "human names", "likely passwords", and so forth, without overwhelming publishers with substantial numbers of false-positives.

Given that false-positives are likely, the detection engine 111 supports a reliable mechanism for ignoring them, that is neither overly-specific (allowing too many through) nor overly general (inadvertently ignoring real issues). To this end, a set of ignore rules can be specified (e.g., in data collection settings), that tell the detection engine 111 which potentially sensitive data to ignore. Any event matching one of these rules will be skipped by the evaluation apparatus 110 when generating and indexing events.

FIG. 2A is an illustration of an example user interface 200 presented during a user session. The user interface 200 is an example shopping web page presented by a web browser in response to a user navigating to the URL for the web page. The user interface 200 includes a page title 210 with the text 211 ("Example Shopping Page"). The user interface 200 also includes an element 220 with text 221 ("Item 1"), an element 230 with text 231 ("Item 2"), a form 240 with text 241 ("Qty") and a text entry field 242, a drop down menu 250 with a value 251 ("Blue") presented in the menu 250, and a checkout button 260 with text 261 ("Checkout"). As shown by the dashed line 263, the user viewing the user interface focused a cursor on the quantity form 240 and then moved the cursor over the checkout button 260 and selected the checkout button 260.

A user device presenting the user interface 200 can provide event data to the evaluation apparatus 110 of FIG. 1. In this example, the event data would include interface data specifying the structure of the user interface 200. The event data would also include user interaction data specifying the focus of the cursor on the quantity form 240, movement of the cursor to the checkout button 260, and the selection of the checkout button 260.

The event data can also include the text presented in the user interface 200 if the text is allowlisted content. In this example, assume that the allowlist for the publisher of the user interface 200 is the allowlist 115 of FIG. 1. That is, the allowlist specifies that content within the "value" field of form tags is allowlisted; that content within the "h1" field of "title" classes is allowlisted, and that content within the "button class" is allowlisted.

Referring now to FIG. 2B, which shows a portion of an example HTML document 270 used to generate the user interface of FIG. 2A. In particular, the portion of the HTML document shows a portion of the language for the page title 210, the quantity form 240, the drop down menu 250, and the checkout button 260. However, the portion of the HTML document 270 does not show all of the language that would be required to generate the user interface 200.

As can be seen from the portion of the HTML document 270, the text 211 of the page title 210 is in the h1 field of title class tags. Thus, the text 211 is allowlisted content. Similarly, the text 242 of the quantity form 240 is in the value field of form tags and is allowlisted content. In addition, the text 261 of the content button 260 is within button tags and is allowlisted content. As the text 251 of the drop down menu 250 is within option value fields of select tags, which are not specified by the allowlist 115, the text 251 is not allowlisted content. Thus, in this example, the text 211, the text 242, and the text 261 would be included in the event data. However, the text 251 would be blocked from the event data since the text is not within allowlisted tags. Assume for the rest of this example that the text 221 and 231 is also not allowlisted content based on the tags of the HTML document 270 (not shown) that include the text are not specified by the allowlist 115.

FIG. 2C is an illustration of a tree structure 280 of a portion of the user interface of FIG. 2A. The illustrated portion shows the node for the body element that includes the user interface elements shown in the user interface 200, the nodes for the div element for the quantity form 240 and its text 241, and the nodes for the div element for the drop down menu 250 and its text 251. As the text 251 of the drop down menu 250 is not allowlisted, the size of the text 251 would be determined based on the size of the drop down menu 250 (e.g., based on the size of the rectangle in which the content of the drop down menu 250 can be placed) since the text 251 is within the drop down menu 250 and the node for the text 251 is a child of the node for the down menu 250.

The graph 280 can also be used to determine when to check the size of non-allowlisted content, such as the text 251. For example, if the style of the body changes, this change can affect the size of the text 251 as the node for the text 251 is a grandchild of the node for the body.

Figure 3:
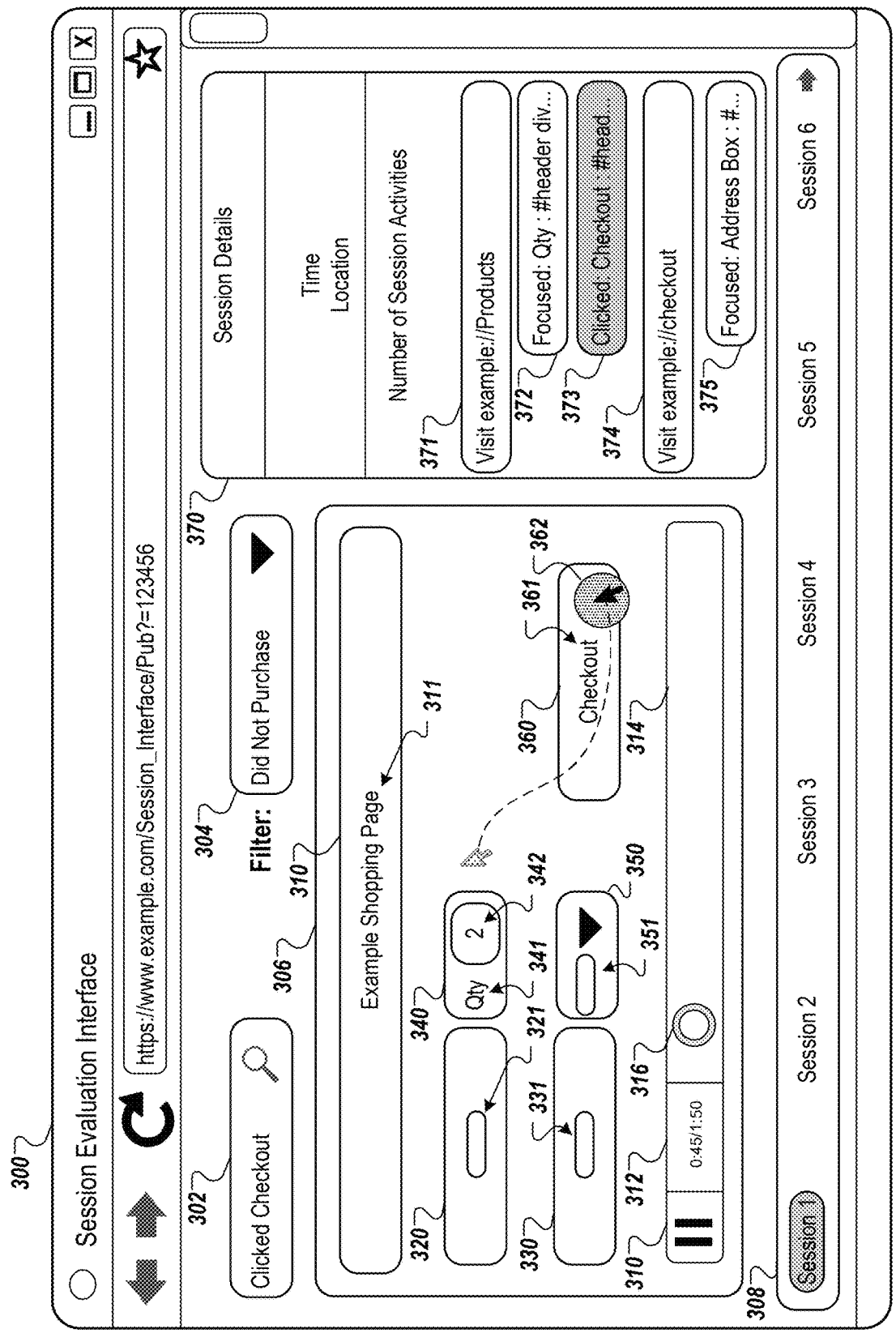
FIG. 3 is an illustration of an example interactive interface for replaying a user session.

FIG. 3 is an illustration of an example interactive interface 300 for replaying a user session. The interactive interface 300 replays the user session with the user interface 200 of FIG. 2A. For example, the evaluation apparatus 110 of FIG. 1 can generate playback of the user session based on the event data received from the user device that presented the user interface.

The user interface 300 includes a search field 302 that receives search criteria for identifying sessions. For example, assume that a publisher is interested in identifying and/or viewing sessions during which a user clicked a checkout button 304 of a given website (or native application) can enter the search phrase "clicked checkout" in the search field 302. Upon submission of the search phrase (e.g., inputting and enter command or clicking on a submission button), a request for session information is transmitted to the evaluation apparatus 110, which may include a search apparatus. The request for session information can include, for example, the search phrase, and identity of the publisher requesting the session information, and/or other information that provides context associated with the request.

In response to receiving the request for session information, the evaluation apparatus 110 can use the search phrase "clicked checkout" to identify one or more sessions during which a user clicked the checkout button 304 of the given website. In some implementations, the evaluation apparatus 110 identifies sessions responsive to the search phrase from an index of user sessions. For example, the index may include one or more entries associating the user action "click" and the user interface element "checkout button" with sessions during which a user clicked on the "checkout" button 304.

The evaluation apparatus 110 provides data identifying sessions responsive to the request for session information to the requesting device. In some implementations, the evaluation apparatus 110 can respond to the request for session information by providing data about one or more sessions that were identified based on the search phrase. Continuing with the example above, the evaluation apparatus 110 can provide a list of sessions 308 that were identified from the index based on the search phrase "clicked checkout." As illustrated by FIG. 3, the sessions in which a user clicked a checkout button include Session 1, Session 2, Session 3, Session 4, Session 5, and Session 6.

The evaluation apparatus 110 can also provide playback data and session activity data for one or more of the identified sessions in response to the request for session information. For example, as illustrated by FIG. 3 Session 1 is shaded, indicating that playback data for Session 1 is available for replay, and that session activity data for Session 1 are available for presentation.

The user interface 300 includes a playback region 306 in which previous sessions are replayed based on the playback data. The playback region 306 includes a playback bar, which includes a play/pause portion 310, a counter 312, and a slider portion 314. The play/pause portion 310 enables a publisher to start and stop replay of the session by interacting with the play/pause portion 310. The counter 312 provides a total duration of the session (e.g., 1 minute 50 seconds) and a portion of the session that is currently being presented (e.g., 45 seconds). The slider portion 314 enables a publisher to quickly move to other portions of the session by sliding a sliding element 316 within the slider portion 314. Continuing with the example above, the playback region 306 is replaying Session 1, as indicated by the shading of Session 1 in the list of sessions.

The playback of Session 1 shows a recreation of the user interface 200 of FIG. 2A based on the event data received from the user device at which the user session occurred. In particular, the replay shows a page title 310 with text 311 that corresponds to the page title and text 211; an element 320 with a masked element 321 that corresponds to the element 220 and text 221; an element 330 with a masked element 331 that corresponds to the element 320 and text 321, a quantity form 340 with text 341 and text entry field 342 that corresponds to the quantity form 240 with text 241 and text entry field 242; drop down menu 350 with a masked element 351 that corresponds to the drop down menu 250 with text 251; and a checkout button 360 with text 361 that corresponds to the checkout button 260 with text 261.

As the text of the elements 220 and 230 were not allowlisted, this text was not collected and sent to the evaluation apparatus 110. Thus, the evaluation apparatus 110 generated masking elements 321 and 331 to represent the text 221 and 231, respectively. As described above, the masking elements 321 and 331 can be size based on the size of the element that includes the text, namely the elements 220 and 230. In this way, the masking elements 321 and 331 fit within the elements 320 and 330, similar to the text 221 and 231 represented by the masking element 321 and 331. Similarly, the evaluation apparatus 110 included a masking element 351 in place of the text 251 of the drop down menu 350 as the text of the drop down menu 350 was not allowlisted. This masking element 351 is sized based on the size of the drop down menu 350, e.g., based on the size of the rectangular area in which content of the drop down menu 350 can be placed.

Some masking elements can include multiple masking elements to represent a string of text. For example, a respective masking element can be used to mask each word in the sentence. When generating a masking element, the evaluation apparatus 110 can start a new masking element at the beginning of each work and end the masking element when it encounters a space or punctuation indicating the end of the word.

The text 311, 341, 342, and 361 is included in the playback as the content of their corresponding user interface elements were allowlisted. In this example, the publisher of the user interface 200 may want to view how the users change the quantities in the quantity form 240 to ensure that the form functions properly and users are able to specify their desired quantities without error or frustration. However, the items being purchased may be considered sensitive information. Thus, the text 221 and 231 that represents the items is not allowlisted and is masked using the masking elements 321 and 331 in the playback of the user session.

The user interface 300 includes a session activity region 370 in which activities that occurred during the session being replayed are presented based on the session activity data. For example, the session activity region 370 presents information such as a time at which the session being replayed occurred (e.g., a day, date, time of day, and/or year), a type of browser that was used to conduct the user session, an Internet Protocol (IP) Address of a device at which the user session occurred, and/or a geographic location of the user device at which the user session occurred. The session activity region 318 can also present a number of activities (e.g., a number of clicks, focuses, page navigations, or other user interactions) that occur during the session.

The session activity region 370 also identifies and/or outlines various activities that occurred during the user session being replayed. For example, the session activity region 370 specifies that, during the session being replayed in the playback region 306 the user navigated to example-.com/products 371, focused on a quantity form 340 within the page 372, clicked the checkout button 373, navigated to example.com/checkout 374, and focused on an address box 375. The activities listed in the session activity region 370 can be arranged in the order in which they occur during the session. For example, the activity 371 occurred prior to the activities 372, 373, 374, and 375. Additionally, the activities listed in the session activity region 370 can be visibly represented in a hierarchical manner. For example, each of the activities 372 and 373 are offset to the right relative to the activity 371, thereby indicating that the activities 372 and 373 occurred during the visit to example.com/products 371.

The list of activities 370 can also provide contextual data regarding the activity. For example, activity 372 indicates that the user interaction "focus" occurred with the quantity form 340. The list of activities 370 can also provide information from the structure of the user interface related to each activity. For example, each activity can include information from nodes associated with the activity from a hierarchical representation of the user interface structure (e.g., from a DOM). In a particular example, activity 372 shows a portion of the DOM nodes that provide contextual information about the quantity form 340 (e.g., #header div . . . ). In some implementations, user interaction with the activity 372 will cause presentation of additional contextual information that is not presented in the list of activities 370 (e.g., a full set of DOM nodes that provide information related to the activity).

As replay of the session proceeds in the replay region 306, activity corresponding to the portion of the replay being presented can be highlighted. For example, after the user focuses on the quantity form 340, the user clicked on the checkout button 360. As the replay shows the mouse moving from near the quantity form 340 to the checkout button 360 (as illustrated by the dashed line), the activity 373 can be shaded (or highlighted) indicating the session activity that corresponds to the portion of the session currently being replayed. When the replay of the session reaches a point at which the user clicked the checkout button 360, the playback data can cause a shaded circle 362 to be presented, thereby visually conveying to the publisher that the user click occurred and a location of the user click on the checkout button 360. Similar animations can be used to visually convey to the publisher that other interactions occurred. For example, with reference to a touchscreen device, a similar shaded circle can be used to visually convey the occurrence of a user tap, and elongated shading animation can be used to illustrate a user swipe or other finger movement on the touchscreen.

As discussed above, a publisher can request replay of one of the other sessions (e.g., Session 2) from the user interface 300 (or another user interface). For example, user interaction with (e.g., a click of) Session 2 in the list of sessions 308 can initiate a request for session information about Session 2. In response to the request, the evaluation apparatus 110 can output, to the requesting device, playback data and session activity data related to Session 2. Upon receipt of the playback data and session activity data, the requesting device can replay Session 2 in the replay region 306, and present information about the activities that occurred during Session 2 in the session activity region 318.

In some implementations, the user interface 300 can include a filter element 304. The filter element 304 enables a publisher to filter sessions identified using, for example, the submitted search phrase. For example, a publisher may be interested in identifying only the sessions during which a user clicked on the checkout button 360, but did not ultimately make a purchase. In this example, the user can submit the search phrase "clicked checkout," and interact with the filter element 304 to select a filter that identifies only those sessions during which the user did not make a purchase (e.g., by clicking on a drop-down button and selecting the "did not purchase" option). This enables the publisher to quickly identify sessions of interest, and/or identify what might have prevented these users from making a purchase (e.g., issues with the user interface).

An example filter is provided here for purposes of illustration, but various other filters can be used and specified as desired. For example, publishers may be interested in evaluating only those sessions that were performed in a specific geographic region (e.g. Southeast United States, Central America, Europe) or only those sessions during which a user terminated the session prior to some specified duration (e.g., within 2 minutes). As discussed in more detail below, providing filters such as these and/or analytic information related to sessions identified using filters can provide a publisher with insight regarding how to better format their user interface and/or achieve specific business goals (e.g., increase sales).

In some implementations, the publisher of the user interface 200 can update the allowlist for the user interface 200 by simply interacting with the user interface elements in the playback of a user session. For example, if the publisher decides that it does not need to view the quantity of the item presented in the quantity form 240, the publisher can select the quantity value 342 in the replay region 306. The evaluation apparatus 110 can detect the selection and update the allowlist status of the quantity value 242 of the quantity form 240. In this example, the evaluation apparatus 110 would change the allowlist status of the quantity value 242 to non-allowlisted content, e.g., by removing from the allowlist 120 the "Tag: form; Field: value" that specifies that this value is allowlisted. For subsequent user sessions with the user interface 200, the quantity value 342 would be not be collected and sent to the evaluation apparatus 110. The publisher can add the quantity value 242 back to the allowlist 120 be selecting the value 342 in the playback of Session 1 or another session with the user interface 200.

Figures 1, 4A:
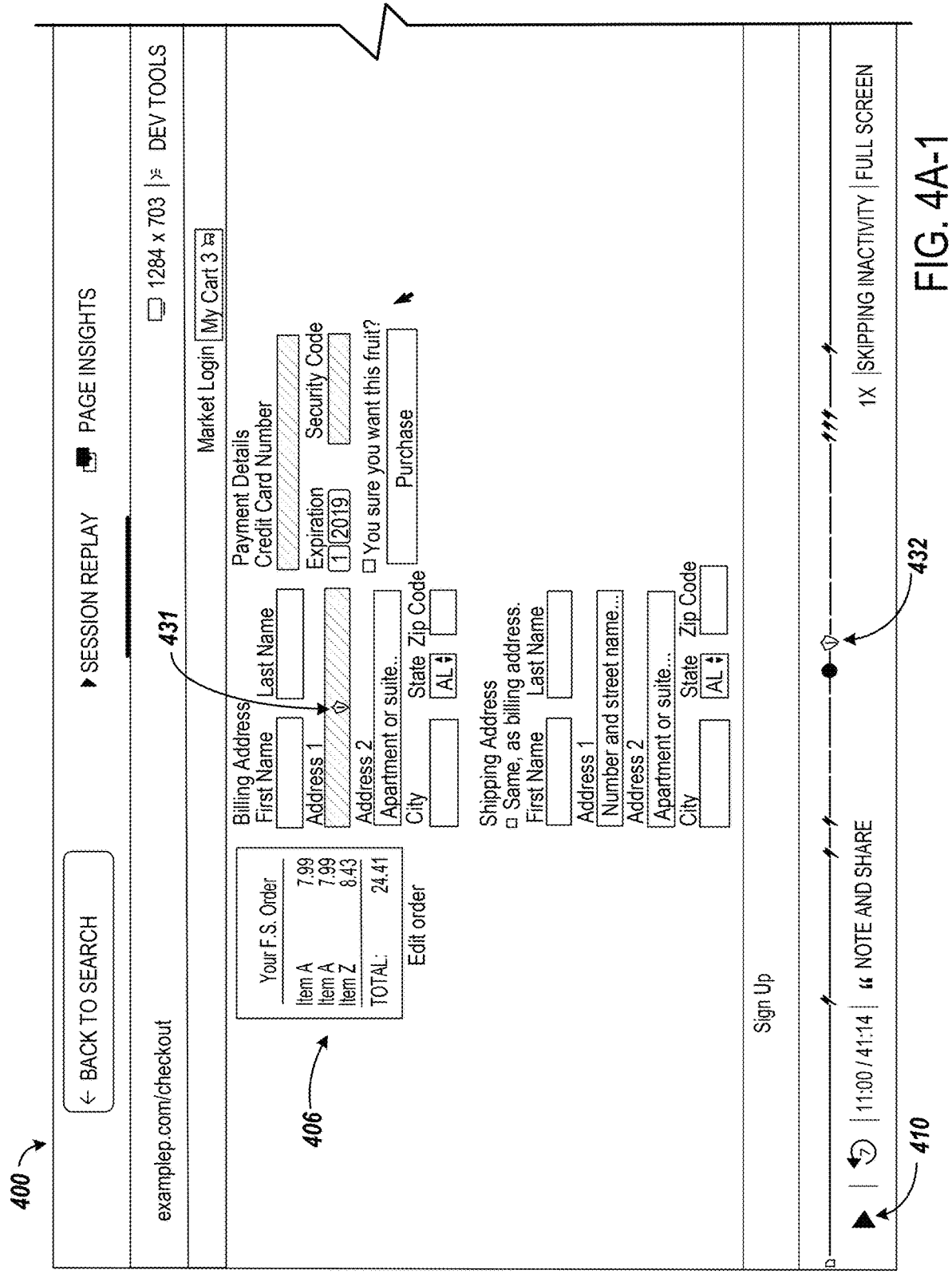
FIGS. 4A (composed of FIGS. 4A-1 and 4A-2) and 4B (composed of FIGS. 4B-1 and 4B-2) are illustrations of an example interactive interface for replaying a user session and enabling a user to indicate whether potentially sensitive data should be excluded from replays of user sessions.
Figures 2, 4A:
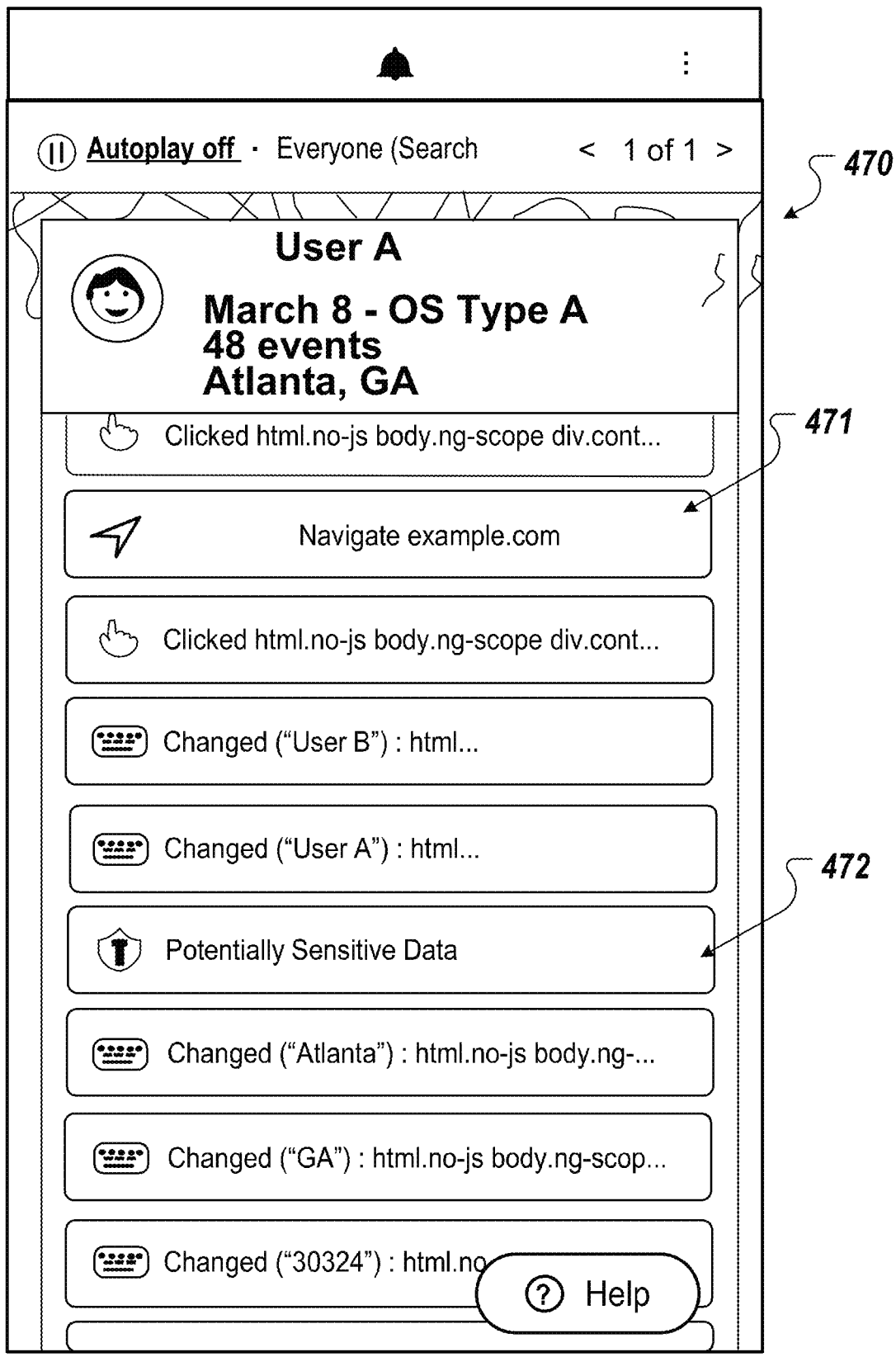
Figures 1, 4B:
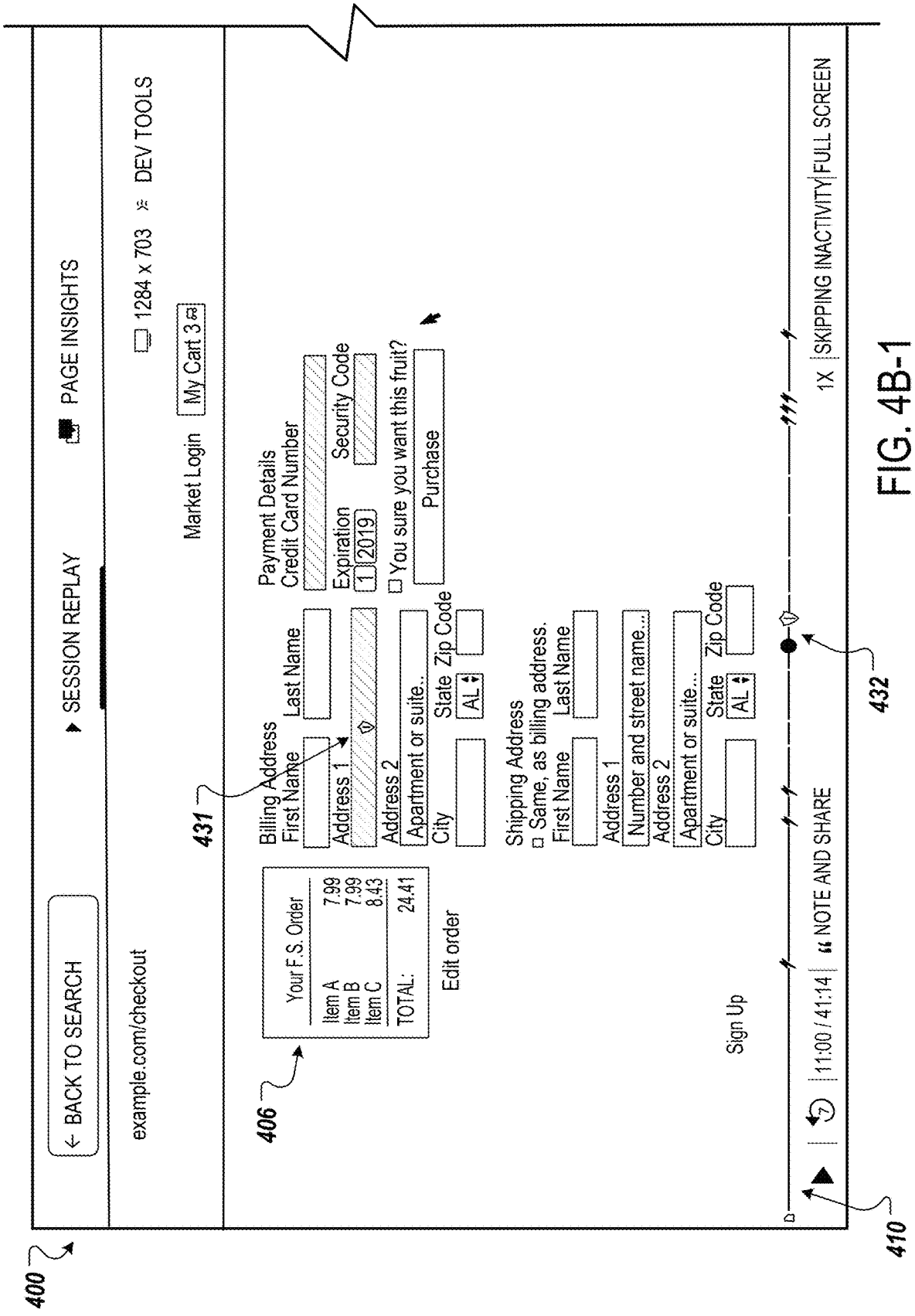
Figures 2, 4B:
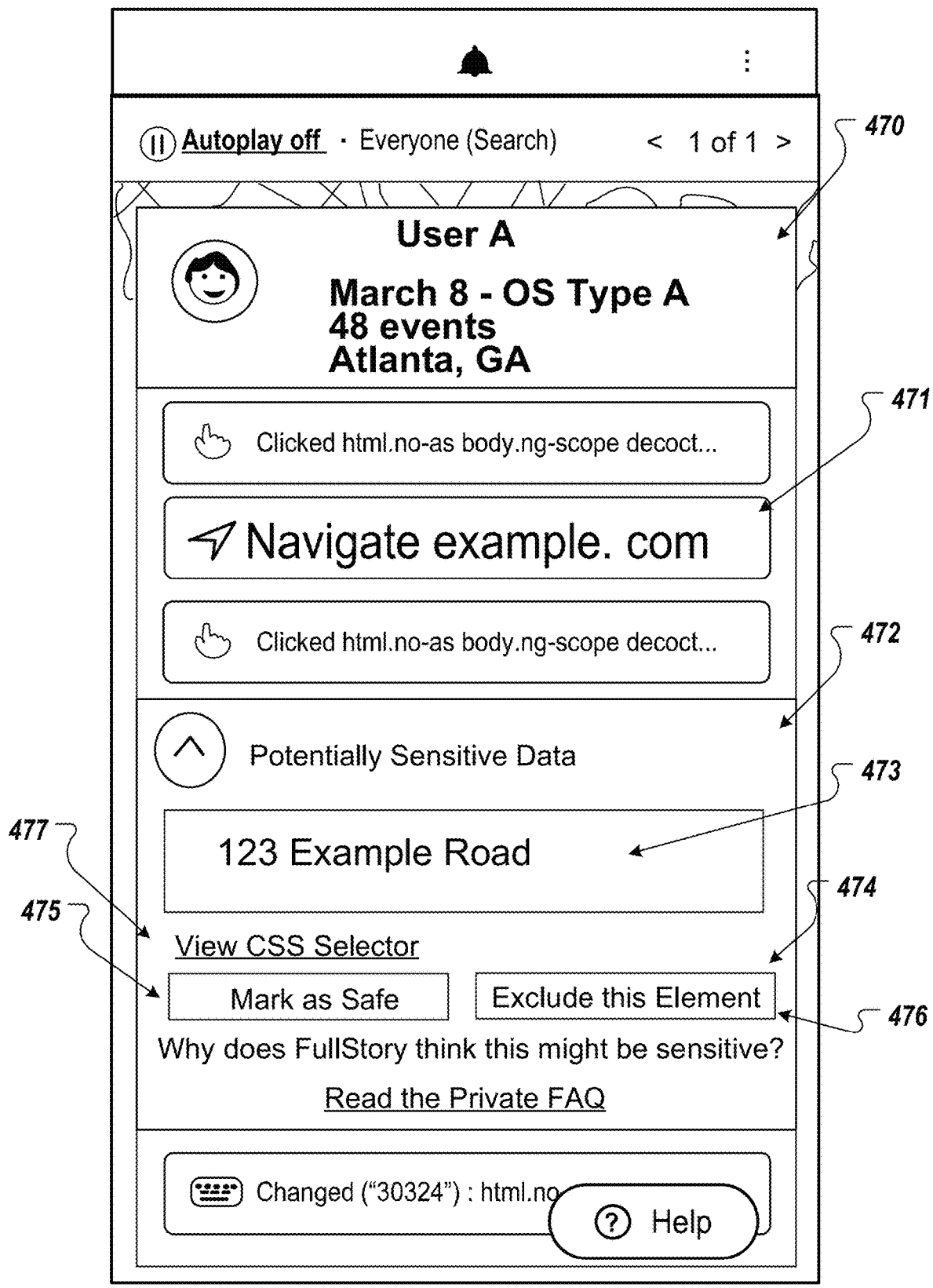
FIG. 2A is an illustration of an example user interface presented during a user session.
FIG. 2B shows a portion of an example hypertext markup language (HTML) document used to generate the user interface of FIG. 2A.
FIG. 2C is an illustration of a tree structure of a portion of the user interface of FIG. 2A.

FIGS. 4A and 4B are illustrations of an example interactive interface 400 for replaying a user session and enabling a user to indicate whether potentially sensitive data should be excluded from replays of user sessions.

Referring to FIG. 4A, which is composed of FIGS. 4A-1 and 4A-2, the interface 400 includes a playback region 406 that is similar to the playback region 306 of FIG. 3 and session activity region 470 that is similar to the session activity region 370. The playback region 406 displays playback of a user session with one or more user interfaces, e.g., of a web page or native application. The session activity region 470 displays information about activities that occurred during the session being replayed based on the session activity data.

The playback region 406 includes a timeline interface 410, which is similar to the play/pause portion 310 of FIG. 3. The timeline interface 410 includes controls that enable the administrator viewing the playback of the user session to control the playback, e.g., start the playback, pause the playback, skip ahead or backwards in the user session, etc.

The interface 400 includes sensitive data indicators 431 and 432 that indicate to the administrator where potentially sensitive data (e.g., as detected by the evaluation apparatus 110 of FIG. 1) was displayed during the user session. In particular, the sensitive data indicator 431 indicates that potentially sensitive data was displayed in a text entry field for entering an address. For example, the user that interacted with the user interface during the user session may have entered a street address in the text entry field, which can be considered potentially sensitive data. The sensitive data indicator 431 can be displayed within the playback region 406 near (e.g., adjacent to and/or within a threshold number of pixels from) the user interface element that displayed the potentially sensitive data during the user session. In this way, the administrator viewing playback of the user session can readily identify which user interface element displays potentially sensitive data. If a user session includes multiple user interfaces that the user navigated to during the user session, the evaluation apparatus 110 can display the sensitive data indicator with the playback of each user interface that included the potentially sensitive data.

In this example, the potentially sensitive data is not initially shown in the playback region 406. The evaluation apparatus 110 can be configured to mask potentially sensitive data during playback of user sessions. This can be part of a privacy by default configuration that prevents the display of sensitive and potentially sensitive data by default, unless a rule is in place to enable the display of the data. As described below, the administrator viewing the playback of the user session can elect to view the potentially sensitive data, e.g., to determine whether the privacy rule should be modified to block the data displayed by the user interface element from being collected from user devices.

The sensitive data indicator 432 indicates when the potentially sensitive data was displayed during the user session. In this example, the potentially sensitive data was shown about halfway through the user session since the sensitive data indicator 432 is shown near the middle of the timeline interface 410. This enables the administrator viewing playback of the user session to quickly navigate to the playback of the user interface with the potentially sensitive data to assess whether the potentially sensitive data is sensitive or safe.

The session activity region 470 can include event elements 471 for events that occurred during the user session. Each event element 471 can include information about a particular event and the event elements can be displayed in order. In addition, the evaluation apparatus 110 can cause the event elements 471 to follow the playback of the user session such that events that occurred during the user session corresponding to the content being displayed in playback are also shown in the session activity region 470.

The session activity region 470 can highlight events related to potentially sensitive data. For example, the event element 472 is an event that included the display of potentially sensitive data. To highlight these potentially sensitive events, the event element 472 can include a different visual characteristic that is different from a corresponding visual characteristic of non-sensitive events. For example, the potentially sensitive event elements 472 can be displayed in a different color, using different hatching, in bold, or using another appropriate type of visual characteristic.

The potentially sensitive event element 472 can hide the potentially sensitive data unless an administrator interacts with the potentially sensitive event element 472. In this example rather than displaying the street address entered by the user in the text entry field, the potentially sensitive event element 472 indicates that the event is related to potentially sensitive data. In this way, the administrator viewing the playback of the user session can determine whether to view the potentially sensitive data. As this data is not needed for accurate playback, an administrator that is not involved with adjusting privacy rules may ignore the potentially sensitive data while an administrator that is involved with adjusting privacy rules can elect to view the potentially sensitive data.

Referring to FIG. 4B, which is composed of FIGS. 4B-1 and 4B-2, if the administrator interacts with the potentially sensitive event element 472, the evaluation apparatus 110 can expand the potentially sensitive event element 472 to display the potentially sensitive data in a content display area 473 and to display a user interface control 474 that enables the administrator to indicate whether the potentially sensitive data is safe (e.g., by interacting with control 475) or sensitive (e.g., by interacting with control 476). Based on the interaction, the evaluation apparatus 110 can update the classification of the potentially sensitive data.

In this example, the control 474 also enables the administrator to request that the evaluation apparatus 110 update the privacy rule that enabled the potentially sensitive data to be collected. For example, a privacy rule can indicate that data displayed by the text entry field for the address can be collected and displayed during playback. If the administrator selects the "Exclude this Element" control 476, the evaluation apparatus 110 can add a privacy rule (e.g., an exclusion rule) that prevents the data displayed by the user interface element (in this example, the text entry field) from being collected from user devices. In another example, the evaluation apparatus 110 can update the rule to mask the data displayed by the user interface element, e.g., at the user device before being sent to the evaluation apparatus 110. In examples in which privacy rules are used for specifying content that can be collected, the evaluation apparatus 110 can delete such a privacy rule to prevent the collection of the data in the future.

In some implementations, privacy rules can be configured using CSS selectors, e.g., CSS selectors that identify the user interface elements from which data can be collected. The potentially sensitive event element 472 can include a control 477 (e.g., a link) that enables the administrator to view the CSS selectors for the user interface element that displayed the potentially sensitive data and/or the corresponding privacy rule. In this way, the user can use this information to modify the privacy rule manually.

As described above, the evaluation apparatus 110 can be configured to notify administrators of detected potentially sensitive data. These notifications can include a privacy user interface that displays the notifications, as shown in FIGS. 5A and 5B. The notifications can include push notifications, e.g., emails to administrators that are involved with generating and modifying privacy rules, as shown in FIG. 6.

FIGS. 5A and 5B are illustrations of example interfaces 500 and 510 that notify an administrator about potentially sensitive data. The interface 500 of FIG. 5A displays notifications related to potentially sensitive information and configured alerts for which notifications are displayed.

The interface 510 of FIG. 5B shows rule information 512 that includes information about privacy rules configured by an administrator and recommendations for modifying privacy rules. The interface 510 also include a sensitive data notification 514 that alerts the administrator to potentially sensitive data that has been detected in event data. The sensitive data notification also includes a user interface control 515 that, when interacted with, initiates playback of a user session in which the potentially sensitive data was detected, e.g. in the interface 400 of FIGS. 4A and 4B. This enables the administrator to quickly view the user interface that displayed the potentially sensitive data and, if appropriate, request that the evaluation apparatus 110 modify the privacy rule for the user interface element that displayed the potentially sensitive information such that the data is no longer collected.

FIG. 6 is an illustration of a notification message 600 that notifies am administrator about potentially sensitive data. The message 600 can be in the form of an e-mail, text message, or other appropriate type of message. Similar to the interface 510 of FIG. 5B, the message 600 includes controls 610 for initiating playback of user sessions that included potentially sensitive data. The control 610 can initiate the playback in the interface 400 of FIGS. 4A and 4B.

Figure 7:
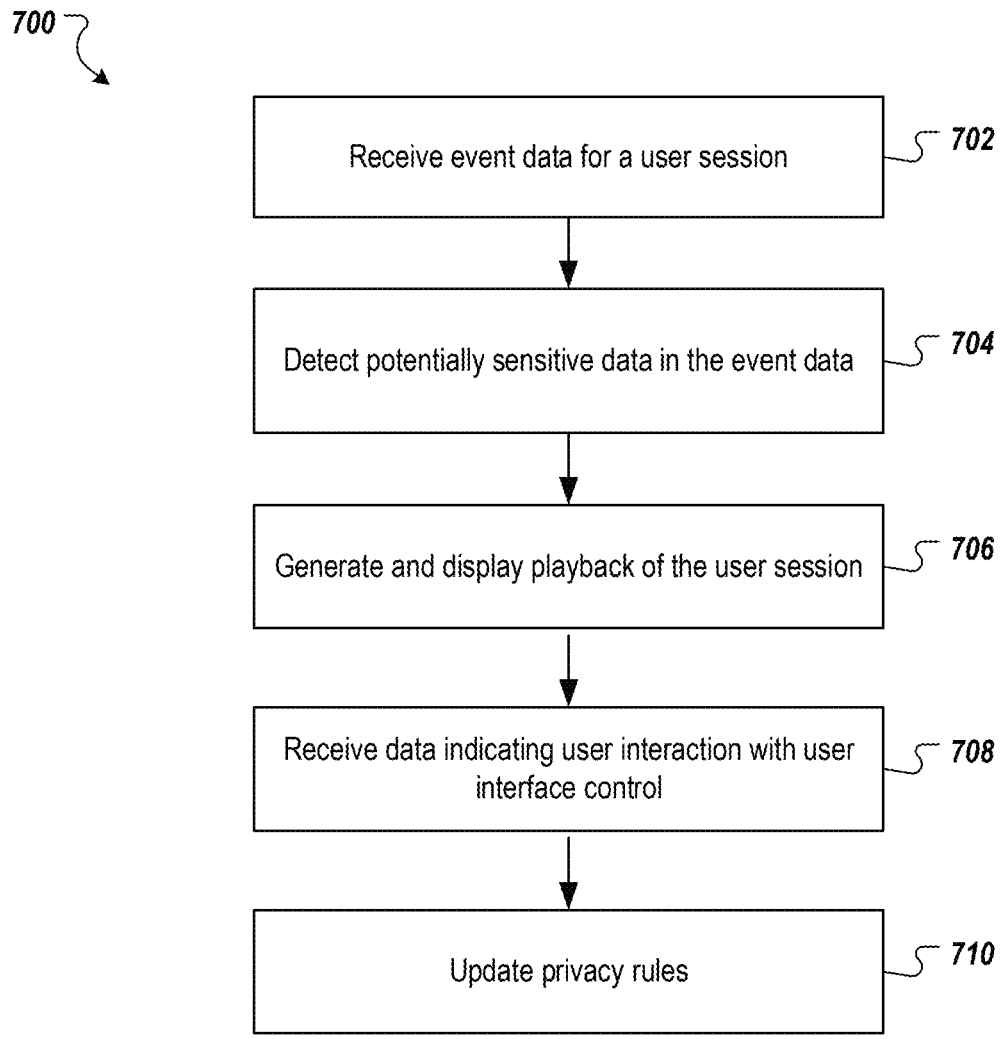
FIG. 7 is a flow chart of an example process for displaying playback of a user session and enabling a user to indicate whether potentially sensitive data should be excluded from replays of user sessions.

FIG. 7 is a flow chart of an example process for displaying playback of a user session and enabling an administrator to indicate whether potentially sensitive data should be excluded from replays of user sessions. Operations of the process 700 can be performed, for example, by one or more data processing apparatus, such as the evaluation apparatus 110. Operations of the process 700 can also be implemented as instructions stored on a computer readable medium, which may be non-transitory. Execution of the instructions cause one or more data processing apparatus to perform operations of the process 700.

Event data is received (702). The evaluation apparatus 110 can receive event data for user sessions that occur on user devices of users. As described above, the event data is data that can be used to generate playback of the user session, e.g., by recreating the user interfaces that were displayed during the user session and displaying events and changes to the user interfaces that occurred during the user session.

Potentially sensitive data is detected in the event data (704). The detection engine 111 can evaluate the event data for each user session to determine whether the event data includes any potentially sensitive data. As described above, the detection engine 111 can use DLP techniques, heuristics, and/or machine learning models to detect the potentially sensitive data.

Playback of the user session is generated and displayed (706). The evaluation apparatus 110 can generate the playback and cause the playback to be displayed on a display of a computer using the event data for the user session.

The evaluation apparatus 110 can highlight potentially sensitive data detected in the event data for the user session during the playback. For example, the evaluation apparatus 110 can display a sensitive data indicator near each user interface element that displayed potentially sensitive data. The evaluation apparatus 110 can also display, for each piece of potentially sensitive data, a sensitive data indicator on a timeline interface to indicate when in the user session the potentially sensitive data was displayed.

As described above, the interface that displayed the playback can also include a user interface control, e.g., a control 474 of a potentially sensitive event element 472, that enables an administrator to select whether to prevent data that is displayed by a user interface element from being collected and/or displayed in the playback of user sessions.

Data indicating user interaction with the user interface control is detected (708). For example, the administrator can interact with a control 475 to indicate that the potentially sensitive data is safe or with a control 476 that requests that the evaluation apparatus 110 prevent the collection and display of the data displayed by the user interface element.

If the administrator interacts with the control 476, the evaluation apparatus 110 can update a set of privacy rules 710. For example, the evaluation apparatus 110 can add a new rule that prevents the data from being collected from the user interface element, activate an existing deactivated rule that prevents the data from being collected from the user interface element, or modify an existing rule such that the potentially sensitive data is no longer collected and/or displayed in the playback of user sessions that include the user interface element.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving, from a client device at which a user session with one or more user interfaces occurs, event data related to the user session;
   detecting potentially sensitive data in the event data;
   generating and displaying playback of the user session using the event data including,
      displaying, within the playback of a particular user interface that includes a user interface element that displayed the potentially sensitive data, a sensitive data indicator that indicates that the user interface element includes the potentially sensitive data, and
      displaying a user interface control that enables a user to select whether to prevent data that is displayed by the user interface element from being displayed during playback of user sessions with user interfaces that include the user interface element,
   receiving data indicating a selection to prevent the data that is displayed by the user interface element from being displayed during playback of user sessions with user interfaces that include the user interface element; and
   in response to receiving the data indicating the selection, updating a set of privacy rules to prevent the data that is displayed by the user interface element from being displayed during playback of user sessions with user interfaces that include the user interface element.

2. The method of claim 1, wherein updating the privacy rule comprises updating the privacy rule to (i) mask the data that is displayed by the user interface element before sending the data from user devices or (ii) block the data that is displayed by the user interface element from being sent from user devices.

3. The method of claim 1, wherein the user interface control enables the user to define the potentially sensitive data as safe.

4. The method of claim 1, further comprising displaying, during playback of the user session, a timeline interface that includes a timeline of the user session and a second sensitive data indicator that indicates, within the timeline, a time at which the potentially sensitive data is shown in the playback of the user session.

5. The method of claim 1, further comprising displaying, with the playback of the user session, a session activity region that includes event elements for events that occurred during the user session, wherein the event stream includes a highlighted event element for the potentially sensitive data.

6. The method of claim 5, wherein user interaction with the highlighted event element causes display of (i) the potentially sensitive data and (ii) the user interface control that enables the user to select whether to prevent data that is displayed by the user interface element from being displayed during playback of user sessions with user interfaces that include the user interface element.

7. The method of claim 1, wherein detecting the potentially sensitive data in the event data comprises detecting the potentially sensitive data using data loss prevention techniques to classify data of user sessions as safe or potentially sensitive.

8. The method of claim 1, wherein detecting the potentially sensitive data in the event data comprises providing the event data as input to a machine learning model trained to output a classification of data into multiple categories related to levels of sensitivity of the data.

9. The method of claim 8, wherein the categories of sensitivity include (i) potentially sensitive and (ii) safe.

10. The method of claim 8, further comprising updating the machine learning model based on user interactions with the user interface control for multiple pieces of potentially sensitive data and respective potentially sensitive data for each user interaction.

11. A system comprising:
   a data store; and
   one or more computers that interact with the data store and execute instructions that cause the one or more computers to perform operations comprising:
      receiving, from a client device at which a user session with one or more user interfaces occurs, event data related to the user session;
      detecting potentially sensitive data in the event data;
      generating and displaying playback of the user session using the event data including,
         displaying, within the playback of a particular user interface that includes a user interface element that displayed the potentially sensitive data, a sensitive data indicator that indicates that the user interface element includes the potentially sensitive data, and
         displaying a user interface control that enables a user to select whether to prevent data that is displayed by the user interface element from being displayed during playback of user sessions with user interfaces that include the user interface element,
      receiving data indicating a selection to prevent the data that is displayed by the user interface element from being displayed during playback of user sessions with user interfaces that include the user interface element; and
      in response to receiving the data indicating the selection, updating a set of privacy rules to prevent the data that is displayed by the user interface element from being displayed during playback of user sessions with user interfaces that include the user interface element.

12. The system of claim 11, wherein updating the privacy rule comprises updating the privacy rule to (i) mask the data that is displayed by the user interface element before sending the data from user devices or (ii) block the data that is displayed by the user interface element from being sent from user devices.

13. The system of claim 11, wherein the user interface control enables the user to define the potentially sensitive data as safe.

14. The system of claim 11, wherein the operations comprise displaying, during playback of the user session, a timeline interface that includes a timeline of the user session and a second sensitive data indicator that indicates, within the timeline, a time at which the potentially sensitive data is shown in the playback of the user session.

15. The system of claim 11, wherein the operations comprise displaying, with the playback of the user session, a session activity region that includes event elements for events that occurred during the user session, wherein the event stream includes a highlighted event element for the potentially sensitive data.

16. The system of claim 15, wherein user interaction with the highlighted event element causes display of (i) the potentially sensitive data and (ii) the user interface control that enables the user to select whether to prevent data that is displayed by the user interface element from being displayed during playback of user sessions with user interfaces that include the user interface element.

17. The system of claim 11, wherein detecting the potentially sensitive data in the event data comprises detecting the potentially sensitive data using data loss prevention techniques to classify data of user sessions as safe or potentially sensitive.

18. The system of claim 11, wherein detecting the potentially sensitive data in the event data comprises providing the event data as input to a machine learning model trained to output a classification of data into multiple categories related to levels of sensitivity of the data.

19. The system of claim 18, wherein the categories of sensitivity include (i) potentially sensitive and (ii) safe.

20. A non-transitory computer readable medium storing instructions that upon execution by one or more computers cause the one or more computers to perform operations comprising:
  receiving, from a client device at which a user session with one or more user interfaces occurs, event data related to the user session;
  detecting potentially sensitive data in the event data;
  generating and displaying playback of the user session using the event data including,
    displaying, within the playback of a particular user interface that includes a user interface element that displayed the potentially sensitive data, a sensitive data indicator that indicates that the user interface element includes the potentially sensitive data, and
    displaying a user interface control that enables a user to select whether to prevent data that is displayed by the user interface element from being displayed during playback of user sessions with user interfaces that include the user interface element,
  receiving data indicating a selection to prevent the data that is displayed by the user interface element from being displayed during playback of user sessions with user interfaces that include the user interface element; and
  in response to receiving the data indicating the selection, updating a set of privacy rules to prevent the data that is displayed by the user interface element from being displayed during playback of user sessions with user interfaces that include the user interface element.

* * * * *